United States Patent [19]

Keem et al.

[11] Patent Number: 4,637,967
[45] Date of Patent: Jan. 20, 1987

[54] ELECTRODES MADE WITH DISORDERED ACTIVE MATERIAL AND METHODS OF MAKING THE SAME

[75] Inventors: John E. Keem, Bloomfield Hills; Richard C. Bergeron, Romulus; Russell C. Custer, Clawson; R. William McCallum, Birmingham, all of Mich.

[73] Assignee: Energy Conversion Devices, Inc., Troy, Mich.

[21] Appl. No.: 770,704

[22] Filed: Aug. 29, 1985

Related U.S. Application Data

[63] Continuation of Ser. No. 546,651, Oct. 28, 1983, abandoned.

[51] Int. Cl.$^4$ .................. H01M 4/86; H01M 4/90
[52] U.S. Cl. .................. 429/101; 429/209; 429/218; 420/900
[58] Field of Search ........... 420/900; 429/57, 101, 429/209, 218, 94

[56] References Cited

U.S. PATENT DOCUMENTS 3,669,745  6/1972  Beccu .................. 429/218
4,431,561  2/1984  Ovshinsky et al. .......... 420/900

FOREIGN PATENT DOCUMENTS

7091736  6/1982  Japan .................. 420/900

Primary Examiner—Donald L. Walton
Attorney, Agent, or Firm—Lawrence G. Norris; James D. Ryndak; Richard M. Goldman

[57] ABSTRACT

The present invention provides an electrode which uses a disordered active material preferably formed by rapid solidification. The active material does not need a binder to be used as an electrode, and thus, is considered self-supporting. The material also is substantially nonporous or impermeable to an electrolyte and when used as an electrode exhibits an increase in cell capacity with improved resistance to corrosion. An electrode of the present invention provides greatly improved cycle life and energy density without a significant decrease in cell capacity. Methods of making the electrode by rapidly solidifying a disordered material are also included. A method of assembling an electrochemical cell using a self-supporting electrode includes the step of producing a disordered active material and aligning the material in a predetermined position in a cell casing.

33 Claims, 10 Drawing Figures

ELECTRODES MADE WITH DISORDERED ACTIVE MATERIAL AND METHODS OF MAKING THE SAME

RELATED APPLICATIONS

This is a continuation of application Ser. No. 546,651 now abandoned filed Oct. 28, 1983.

BACKGROUND OF THE INVENTION

The subject matter of this invention relates to the field of energy storage and utilization with an improved battery and to an electrode for use therein. More particularly, the invention relates to a battery having a mechanically self-supporting ribbon electrode using disordered active material which may be formed by rapid solidification. The battery electrode stores electrochemical energy for subsequent release to produce an electrical current while maintaining structural integrity during such a cycle.

Some research has been conducted involving hydrogen storage secondary batteries. However, a basic understanding resulting in a viable approach to optimizing such batteries has not been forthcoming in the scientific or patent literature. Examples of such efforts are U.S. Pat. Nos. 3,669,745 and 3,824,131 and a technical paper entitled "A New Type of Reversible Negative Electrode for Alkaline Storage Batteries Based on Metal Alloy Hydrides," 1974, 8th International Power Sources Conference. These research efforts have not resulted in widespread commercial utilization of this battery technology. In fact, the prior research suggests no significant improvement over conventional battery systems such as nickel cadmium. As a result, the hydrogen storage battery system has apparently been ignored or abandoned.

Secondary batteries using a hydrogen rechargeable electrode operate in a different manner than lead acid, nickel cadmium or other battery systems. The hydrogen storage battery utilizes an anode which is capable of reversibly electrochemically storing hydrogen and usually employs a cathode of nickel hydroxide material. The anode and cathode are spaced apart in an alkaline electrolyte. Upon application of an electrical current to the anode, the anode material (M) is charged by the absorption of hydrogen:

Upon discharge the stored hydrogen is released to provide an electric current:

The reactions are reversible and this is also true of the reactions which take place at the cathode. As an example, the reactions at a conventional nickel hydroxide cathode as utilized in a hydrogen rechargeable secondary battery are as follows:

Charging: $Ni(OH)_2 + OH^- \rightarrow NiOOH + H_2O + e^-$
Discharging: $NiOOH + H_2O + e^- \rightarrow Ni(OH)_2 + OH^-$ The battery utilizing an electrochemically hydrogen rechargeable anode offers important potential advantages over conventional secondary batteries. Hydrogen rechargeable anodes should offer significantly higher specific charge capacities than lead anodes or cadmium anodes. Furthermore, lead acid batteries and nickel-cadmium type secondary batteries are relatively inefficient, because of their low storage capacity and cycle life. A higher energy density should be possible with hydrogen storage batteries than these conventional systems, making them particularly suitable for battery powered vehicles and other mobile applications. Hydrogen storage batteries have not lived up to their potential, however, because of the materials and mechanical structures used.

The materials used for the hydrogen rechargeable anode of the battery are of utmost importance since the anode must efficiently perform a number of functions within useful operating parameters in order to have an efficient charge/discharge cycle. The material must be capable of efficiently storing hydrogen during charging with insignificant selfdischarge until a discharge operation is initiated. Since reversibility of the charge/discharge reactions is necessary, a highly stable bonding of hydrogen to the storage sites of the anode is not desired. On the other hand, it is also undesirable if the bonds between the hydrogen atoms and the anode material are too unstable. If the bonds are too unstable during charging, the dissociated hydrogen atoms may not be stored by the anode, but may recombine to form hydrogen gas such as in the electrolysis of water. This can result in low efficiencies, loss of electrolyte and inefficient charging.

Another important characteristic of the hydrogen rechargeable electrode is its structure. Prior art hydrogen storage materials use a binder material to physically hold the hydrogen storage material together and in electrical contact with a grid collector. Since the binder material is not itself an active hydrogen storage material, its use decreases the capacity of the cell. The increase in weight of inactive material also decreases the energy density of a cell using the electrode.

As an electrode charges and discharges, the hydrogen storage material expands and contracts. These volumetric changes can cause cracking and disintegration of the electrode's structural integrity. The electrode tends to fail if the hydrogen storage material loses electrical contact with, or falls away from, the collector grid. Using more binder material will delay this problem and extend cycle life of the cell, but the capacity of the cell decreases.

Another problem experienced by some hydrogen rechargeable electrodes is low charge and discharge rates. Increasing the surface area of an electrode shortens the hydrogen diffusion lengths and increases the charge and discharge rates. For prior art electrodes, increasing the surface area is achieved by increasing the porosity. Increasing the porosity, however, allows the electrolyte to corrode and degrade the electrode's structural integrity. Again, this leads to early electrode failure as the material disintegrates and falls away from the grid collector. Attempts to alleviate this problem by coating the surface to prevent the active material from falling away is not helpful since any coating would decrease the needed porosity.

Many previous attempts to utilize hydrogen in secondary batteries have proven to be unsuccessful because of the limiting factors of structural and electrical integrity in using hydrogen storage materials. The invention herein provides a new and improved battery having an electrode with an active material and mechanical structure allowing for high charge and discharge rates, efficient reversibility, high electrical efficiency, bulk hydrogen storage without substantial structural change or poisoning, mechanical integrity over long cycle life, and deep discharge capability.

SUMMARY OF THE INVENTION

The present invention includes an electrode using a disordered active material. The problems in prior art electrochemical cells as discussed above are obviated by the present invention, all with improved electrochemical performance of the cells.

Preferably, the disordered material includes titanium, nickel, and at least one other element selected from the group consisting of zirconium, aluminum, tin, indium, lead, rare earth metals, cobalt, chromium, copper, iron, vanadium, niobium, magnesium, molybdenum, palladium, silicon, boron, carbon, and hafnium.

The present invention provides an electrode for use in an electrochemical cell containing an electrolyte wherein the electrode includes an active material which is substantially nonporous or impermeable to the electrolyte.

The present invention also provides an electrochemical cell which includes at least one electrode means for storing energy. The electrode means is formed from a disordered active material. The cell also includes at least one counter electrode means providing for the release of the energy stored in the electrode means. The counter electrode means is positioned in the cell and spaced in operative contact with the electrode means. The cell also includes a casing having the electrode means and counter electrode means positioned therein.

A method of assembling an electrochemical cell is provided using a self-supporting electrode which includes the steps of producing a disordered active material and aligning the material in a predetermined position in a cell casing. The present invention also provides a method of preparing a electrode which includes the step of rapidly solidifying a disordered active material.

DETAILED DESCRIPTION OF THE INVENTION

Generally, the present invention provides an electrode including a disordered active material preferably formed by rapid solidification. The resultant material does not need a binder to be used as an electrode, and thus, is considered self-supporting. The material also is substantially nonporous and impermeable to an electrolyte. The composition of the material includes titanium and nickel in combination with at least one other element such as aluminum, zirconium, niobium, hafnium, or vanadium. Various counter electrode systems, and more particularly, electrolytes, may be used in an electrochemical cell containing the inventive electrode. The electrodes of the invention provide greatly improved cycle life without a significant decrease in cell capacity. Without the need for an inactive electrode material such as a binder, the energy density of a cell containing the inventive electrode is significantly increased.

In particular, the electrodes of the present invention provide a disordered material. Although the present application discusses the inventive electrode using hydrogen storage materials, the invention is not as limited. The present invention also includes materials used in the electrodes of other electrochemical systems which produce and store energy. Accordingly, the disordered material may include means for storing hydrogen and subsequently discharging at least a portion of the stored hydrogen to provide a supply of electrons. Such disordered materials have tailor-made local chemical environments which are designed to improve the electrochemical performance of the electrode by increasing the density of catalytically active sites for hydrogen disassociation and also of hydrogen storage sites.

Disordered materials are ideally suited for manipulation since they are not constrained by the symmetry of a single phase crystalline lattice or by stoichiometry. By moving away from materials having such restrictive single phase crystalline symmetry, it is possible to accomplish a significant alteration of the local structural and chemical environments involved in electrochemical hydrogen storage to greatly enhance the properties of the hydrogen storage electrode.

The types of disordered structures which provide the local structural chemical environments for the enhanced electrochemical hydrogen storage characteristics contemplated by the invention include polycrystalline materials lacking long-range compositional order, microcrystalline materials, amorphous materials or multiphase materials containing both amorphous and crystalline phases. The following list provides a classification of the spectrum of disordered structures contemplated by the present invention:

1. Polycrystalline materials lacking long-range compositional order.
2. Microcrystalline materials.
3. Mixtures of polycrystalline and microcrystalline phases.
4. Mixtures of polycrystalline or microcrystalline and amorphous phases.
5. Amorphous materials containing one or more amorphous phases.

An advantage of the disordered materials is that their compositions can be varied over a substantially continuous range of percentages for the component elements to enhance the structural integrity of the material, and thus, the electrode. Providing a high degree of mechanical integrity to the structure of the electrode significantly extends its cycle life. Furthermore, the disordered material allows the flexibility to maximize the cell capacity while maintaining the structural integrity of the electrode.

After improving the capacity and cycle life of cells using the inventive electrodes, the charge and discharge rate properties also may be optimized. These properties describe the relationship of voltage and time as a function of charge and discharge rates. The width and thickness of the electrodes of the present invention can be adjusted to control the surface area to volume ratio and thus vary the charge-discharge rate properties. The materials of the present invention may have anisotropic dimensions which means that the material exhibits lengths of different values when measured along axes in different directions. Thus, the material will generally have different length, width and thickness dimensions or at least length and width dimensions which are significantly greater than the thickness of the material. Examples of suitable anisotropic material are a ribbon, wire, or sheet. These examples, however, are not meant as limitations. The dimensions and configurations of an electrode and a battery made from such an electrode are dependent upon the application and can be of any size, shape, capacity, etc. as required. Preferably, the thickness of the material is less than about 50 microns. The material can be made in a continuous fashion with the length cast or cut in lengths of a predetermined value.

Powder electrodes of the prior art must rely upon porosity and particle size to improve charge-discharge rate properties. The present invention is not limited by these constraints and does not increase the porosity of the material to increase the charge-discharge rates. The problem of corrosion and structural degradation is minimized by not increasing the porosity. The material used as the electrodes of the present invention can be made substantially nonporous and impermeable to the electrolyte and thus minimize the corrosion problem. Hence, the structural integrity of the material is preserved to insure long cycle life.

The porosity of the present invention can also be considered in terms of the mean pore size of the material which in the case of the present invention is less than 0.001 microns. Alternatively, the total porosity of the material measured by any conventional method, such as the Mercury Intrusion Method, would be less than approximately 5% by volume of the material.

It is important to distinguish between the porosity of the material and the void space which may exist in the inventive materials. Porosity describes the property of containing pores which are minute channels through a solid or open spaces in a solid. Porosity also can be used to describe the total volume occupied by such pores. Void spaces differ in that the spaces in a solid are closed and do not exist as channels through the solid. Although void space may affect the density of the material, porosity is unaffected.

Preferably, the present invention is formed with an irregular surface having ridges, wrinkles, and/or holes through the material which result in anisotropic tensile properties. These holes or any other macroscopic passages in the material are to be distinguished from the pores discussed above.

The density of the materials used to make the inventive electrodes and the bulk density of the electrode are significantly greater than many of the materials or fabricated electrodes of the prior art. Preferably, the density of the material or the electrode is not less than 5 g/cc nor greater than 8 g/cc. Optimally, the density of the material or the electrode is in the range of about 6 to 7.5 g/cc. The materials of the present invention preferably have a density greater than about 90% of the density of the mixed phase polycrystalline ingot form of the material. The bulk density of the electrode is determined by the density of the active material and the packing density of the multiple layers or windings of the active material. Packing density is the percentage of electrode space filled by the active material instead of other electrode material such as a binder, for example, or space in the form of voids and/or pores. A packing density of 80% or greater is possible with the invention.

The present invention contemplates compositions of disordered materials which charge by absorbing and storing hydrogen and subsequently discharge at least a portion of the stored hydrogen to provide a supply of electrons. Suitable compositions include titanium and nickel with at least one other element selected from a group consisting of zirconium, aluminum, tin, indium, lead, rare earth metals, cobalt, chromium, vanadium, niobium, magnesium, molybdenum, palladium, silicon, boron, carbon, and hafnium. Other suitable binary compositions include nickel with either vanadium, niobium, silicon, boron, or carbon, and preferably in combination with at least one of the above selected elements.

An advantageous ternary composition incorporates titanium, nickel, and aluminum. At least one additional element may be added to this ternary compound selected from a group consisting of niobium, zirconium, vanadium, and hafnium.

Suitable concentrations of these elements in the material include at least about 40 atomic percent, but not in excess of about 75 atomic percent of titanium; at least about 15 atomic percent but not in excess of about 55 atomic percent of nickel; and at least a trace amount, but not in excess of about 15 atomic percent of aluminum. Preferably, the amount of titanium is between about 44 and 60 atomic percent; the amount of nickel between about 35 and 40 atomic percent; and the amount of aluminum between about 3 and 5 atomic percent.

The ternary composition may contain an additional element which is preferably niobium or vanadium or both. Other suitable elements include zirconium, chromium, cobalt, copper, and iron. The additional element is present in an amount not in excess of about 11 atomic percent, or preferably, in an amount at least about 3 atomic percent, but not in excess of about 5 atomic percent.

An advantageous quaternary composition includes nickel, titanium, niobium, and zirconium. Suitable concentrations of these elements are at least about 5 atomic percent, but not in excess of about 55 atomic percent of titanium; at least about 30 atomic percent, but not in excess of about 60 atomic percent of nickel; at least about 10 atomic percent, but not in excess of about 20 atomic percent of niobium; and at least about 3 atomic percent but not in excess of about 10 atomic percent of zirconium. This quaternary composition may additionally include vanadium in an amount of at least about 5 atomic percent.

The present invention also contemplates an electrochemical cell which includes at least one electrode means for storing energy. The electrode means is formed from a disordered active material. The disordered material is of the structure and composition previously discussed herein. The cell also includes at least one counter electrode means providing for the release of the energy stored in said electrode means. The counter electrode means is spaced in operative contact with the electrode means. The cell also includes a casing which has the electrode means and the counter electrode means positioned therein. The counter electrode means includes an electrolyte placed in operative contact with the electrode means and the counter electrode means. A plurality of these cells may be assembled to produce a battery. Specifically, a hydrogen storage battery may be formed if each cell includes at least one anode means for efficient reversible hydrogen absorption and desorption. At least one cathode means is provided for reversible oxidation.

Figure 1A:
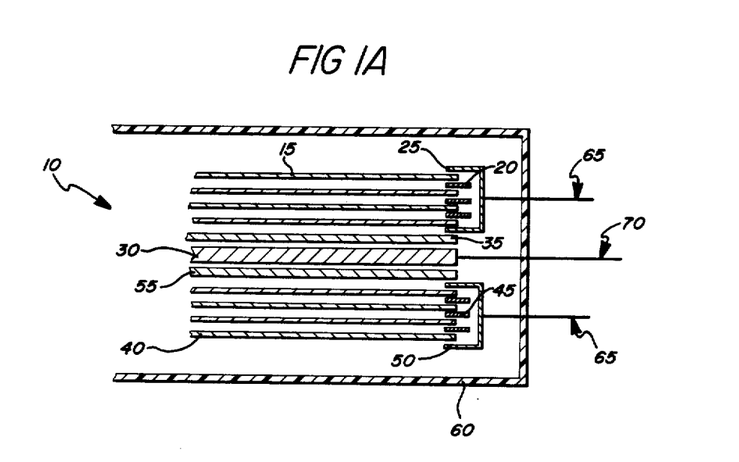
FIG. 1A is a cutaway side view of a flat cell embodiment using an inventive electrode.

Various electrochemical cell embodiments utilizing the inventive electrodes are contemplated. Referring to FIG. 1A, a flat cell 10 is illustrated which uses a plurality of substantially flat sheets 15 of the material described above. Interleafed between the sheets 15 is a plurality of flat tabs 20 which extend beyond the edges of the sheets 15 so that a buss tab 25 may be used to electrically contact each of the tabs 20. The buss tab 25 may then be physically crimped to compress the sheets 15 and tabs 20 together. The tabs 20 and buss tab 25 may be made of suitably conductive metals such as nickel. The flat cell 10 includes a counter electrode 30 which is substantially flat and aligned to be in operative contact with the plurality of sheets 15. A separator 35 is disposed between the counter electrode 30 and the sheets 15.

A second plurality of substantially flat sheets 40 may be spaced in operative contact with the counter electrode 30 on the side opposite the first plurality of flat sheets 15. Similarly interleafed between the sheets 40 is a second plurality of flat tabs 45 which extend beyond the edges of the sheets 40 so that a second buss tab 50 may be used. A second separator 55 is disposed between the second plurality of sheets 40 to electrically contact each of the tabs 45 and the counter electrode 30.

The cell 10 depicted in FIG. 1A may be sealed in a suitable material, such as a plastic wrap 60, which does not deteriorate in contact with the electrolyte used and allows venting of the cell 10 should it gas during operation. The first and second buss tab 25, 50 are electrically connected to first set of leads 65 which extends outside of the cell plastic 55. Likewise, a second lead 70 electrically connects to the counter electrode 30 and extends outside of the cell plastic 60.

Figure 1B:
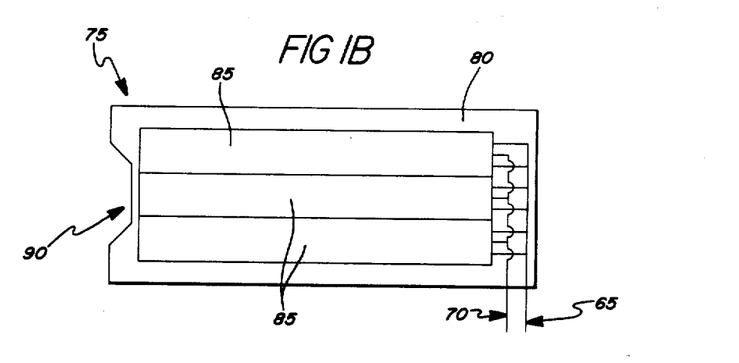
FIG. 1B is a side view of a battery using a plurality of the inventive cells illustrated in FIG. 1A.

A plurality of cells similar to the cell 10 illustrated in FIG. 1A may be assembled as a battery 75 depicted in FIG. 1B. A battery casing 80 contains the individual cells, collectively numbered as 85. The casing 80 includes a venting means 90 should any of the cells 85 excessively gas during operation. Since the cells 85 are already sealed in plastic 60, there is no need for forming individual cell walls with the casing 80, thus reducing the space and weight of the casing 80. The casing 80 may be a rigid material or a settable material, such as an epoxy. The cells 85 are easily stacked together and placed in a mold (not shown) into which a setting material is introduced around the circumference of the stacked cells 85. The first and second lead 65, 70 extend through the casing 80 available for external connection.

Figure 1C:
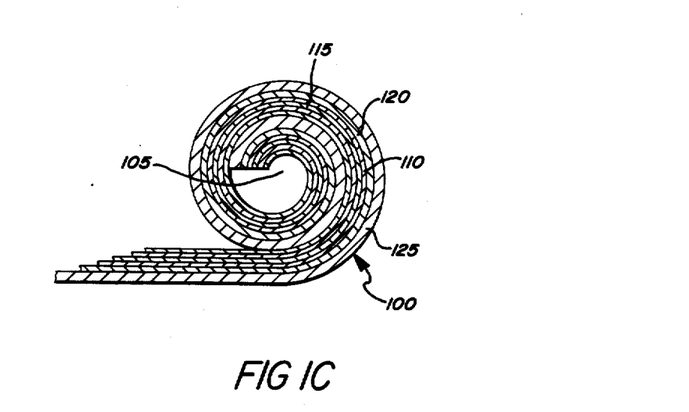
FIG. 1C is a side view of a jelly roll cell embodiment using an inventive electrode.

FIG. 1C illustrates a jelly roll cell 100 which is made by spirally winding a flat cell about an axis 105. The jelly roll cell may then be placed in a can which contains a conductive adhesive (not shown) contacts the tabs 110 interleafed with a plurality of sheets 115 of the material described above. A separator 120 is spaced between the sheets 115 and a counter electrode 125.

Figure 1D:
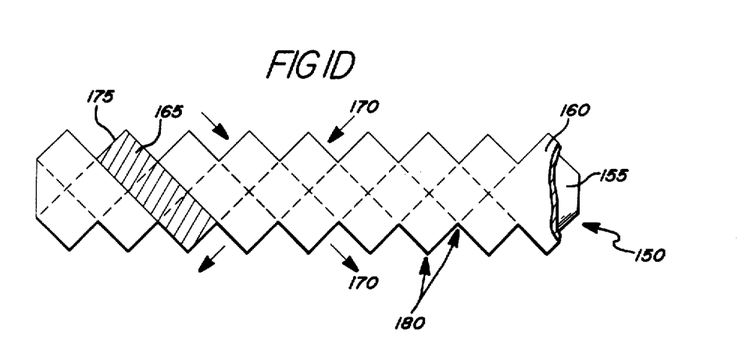
FIG. 1D is a top view of a wound cell embodiment using an inventive electrode.

Another cell embodiment is illustrated in FIG. 1D which depicts a wound cell 150 including a flat rectangular counter electrode 155. A separator 160 covers the counter electrode 155. Wound around the counter electrode 155 is the material in ribbon form 165. The configuration of the winding is a double diagonal wind in the directions illustrated by the arrows 170. This winding allows the cell 150 to bend without unraveling the winding, instead it tightens upon itself. To prevent the ribbon 165 from buckling on the edges 175 of the counter electrode 155, a sawtooth configuration 180 allows the ribbon 165 to squarely rest on the edges 175. Other suitable embodiments would use a flat edge on non-diagonal windings.

Figure 1E:
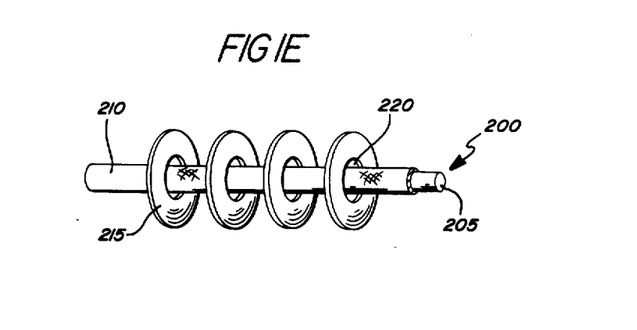
FIG. 1E is a side view of a spool cell embodiment using an inventive electrode.
Figure 1F:
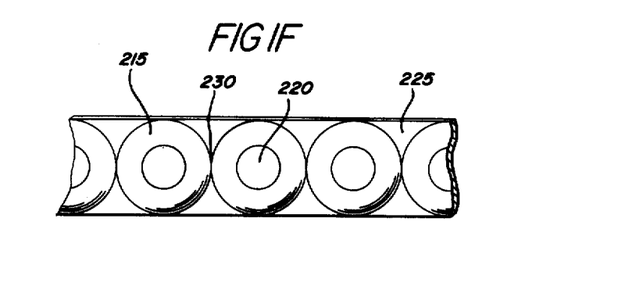
FIG. 1F is a top view of an inventive ribbon illustrating the spool cell components.

FIG. 1E illustrates a spool cell 200 which includes a rod-like counter electrode 205. A separator 210 covers the counter electrode 205. The inventive material is formed as a plurality of washer-like bodies 215, each having a hole 220. The counter electrode 205 is inserted through the hole 220 of each body 215 which stack upon one another. The washer-like bodies 215 may be stamped out of the material formed as a ribbon 225 as illustrated in FIG. 1F. The bodies 215 may be connected at point 230 and then folded upon one another before inserting the counter electrode 205 through the holes 220.

The disordered materials of the present invention are preferably prepared by rapid solidification. Rapid solidification refers to methods and processes for rapidly quenching a material from the liquid state into the solid state at a quench rate sufficiently high to freeze the positions of the atoms in the atomic arrangement of the material in a variety of non-equilibrium arrangements. As previously discussed, the disordered material so produced may be one of many types of structures. Is is particularly desireable for the structure to either be substantially amorphous or be a multiphase material generally amorphous in character without long range atomic disorder, but also containing some localized atomically ordered structures such as microcrystalline and/or polycrystalline inclusions. Specifically, amorphous refers to an alloy or material which has long range disorder, although it may have short or intermediate order or even contain at times some crystalline inclusions.

The material is typically ejected in its liquid state into a high quench environment such as onto a chill wheel where it solidifies before complete crystallization can begin. Generally, the rapid solidification processes are to be contrasted to the thin film deposition processes such as sputtering or vacuum deposition which are conducted at low rates of particle transfer or to a substrate to form a thin film. Preferably, the rapid solidification processes commonly referred to as melt spinning, jet casting, multiple jet casting, or planar flow casting are used. The present invention contemplates the use of these rapid solidification processes regardless of the particular apparatus used or details of the process itself. The present invention is not limited to a particular structure nor material made by the following methods. Additionally, any electrode made by these methods may initially be in either the charged or discharged state.

Figure 2:
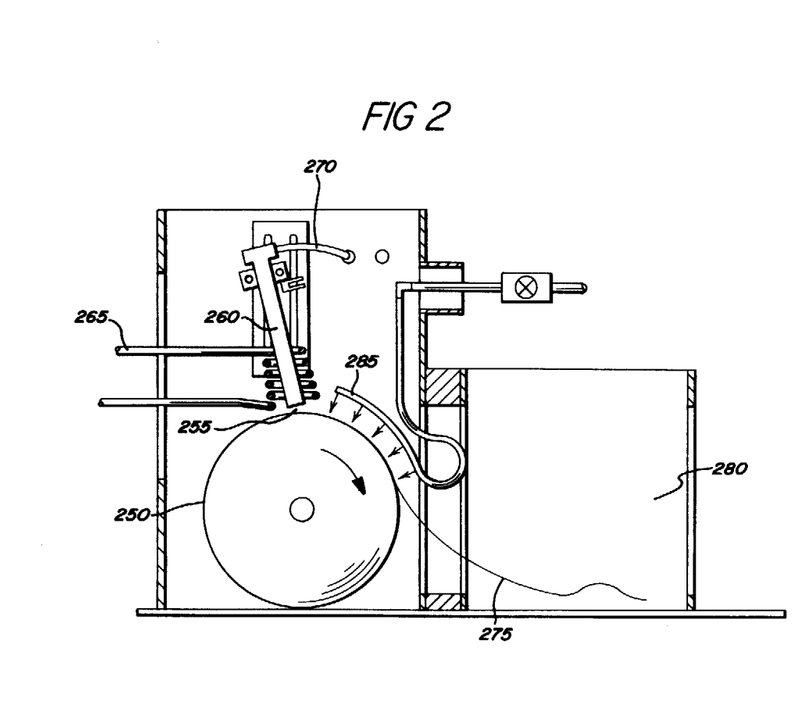
FIG. 2 is a diagrammatic side view of an apparatus used in a rapid solidification process.

In particular, FIG. 2 shows a diagrammatic side view illustrating an apparatus used in the rapid solidification process contemplated by the present invention. The chill surface 250, here illustrated as a wheel, travels in the direction of the arrow in close proximity to a nozzle orifice 255. The disordered material described above is heated to a molten state in a crucible 260 by an induction heater 265. The crucible 260 is further equipped with means 270 for pressurizing the molten disordered material contained therein to effect expulsion through the nozzle orifice 255. The molten disordered material may be agitated in order to maintain uniformity of dispersion. In operation, the molten disordered material is maintained under pressure in the crucible 260 and ejected through the nozzle orifice 255 onto the surface of the rotating chill wheel 250, whereupon it immediately solidifies to form the material having anisotropic dimensions, otherwise referred to as a ribbon 275. The ribbon 275 is directed into a collection area 280 as either a continuous strip or it may be cast to a predetermined length as it is removed from the chill wheel 250. The apparatus may use a plurality of gas jets 285 to direct an inert gas, such as argon, onto the ribbon before it leaves the chill wheel. This allows control of the quench duration. Other means for aiding the solidification of the molten material may be used.

In order to obtain the disordered materials desired by the present invention, the surface of the chill wheel 250 must ordinarily be able to obtain quench rates in the area of at least $10^{4°}$ C. Significantly lower quench rates per sec. will result in crystalline ribbons. In order to obtain a sufficiently high quench rate to make a disordered material, a 10-inch diameter chill wheel must ordinarily revolve between 2,000 and 3,000 rpm. The chill wheel 250 may be optionally provided with cooling means (not shown) such as a circulating cooling liquid through its interior. The process of the present invention is usually carried out in a controlled atmosphere.

The width and thickness of the ribbon produced by the rapid solidification process can be readily adjusted by changing the interrelationship between the volumetric flow rate, the diameter of the nozzle orifice 255, and the chill wheel's surface velocity. Generally, the nozzle orifice has a diameter of about 0.0635 to 0.114 cm. and is located approximately 1-2 mm. above the chill wheel 250. The axis through the crucible 220 is tilted at an 88° angle from the horizontal in the plane of the chill wheel 250. As a general proposition, it can be stated that an increase in the chill wheel surface velocity results in production of a thinner strip and, conversely, that a reduction of the velocity results in a thicker strip.

The present invention contemplates a method of preparing an electrode which includes the step of rapidly solidifying a disordered material. The desired material is of the structure and composition previously described herein.

Figure 3:
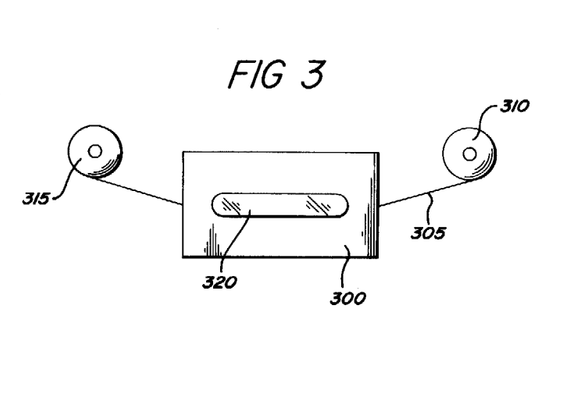
FIG. 3 is a block diagram of an illustrative apparatus for depositing a collector on the inventive electrode.

The method also may include placing a collector in electrical contact with the material so as to collect the electrons produced during the operation of the electrode. The collector may be continuously deposited onto the material in the fashion generally depicted in FIG. 3. Referring to that figure, a block diagram of a system apparatus is illustrated. Although this process could be performed on a batch basis, continuous processing is preferred. Thus, the collector is deposited on the material in the application chamber 300. A roll of the material 305 is fed off of a payout reel 310 into and through the chamber 300 where the collector is deposited. After the collector has been deposited, the material 305 moves to a take-up reel 315. The process may be observed through a viewing port 320 or through monitoring or control instrumentation.

An additional step which is contemplated by the present invention is abrading the ribbon for operative contact with an electrolyte. Such an abrading process removes any foreign matter on the surface of the material which may interfere with the contact between the material and the electrolyte.

Another means for removing foreign matter from the surface of the material contemplated by the invention is to chemically etch the material's surface. Any suitable solution such as equal parts of nitric acid and HF mixed in a 1:25 ratio with water may be used.

One may coat the electrode once the foreign matter has been removed. Such a coating could prevent the reformation of a detrimental surface layer and yet not interfere with the function of the electrode. A coating also could effect the characteristics of the active material. For example, sputter coating the inventive material with nickel appears to enhance the desorption kinetics of the material. Suitable coatings also include titanium/nickel and palladium. The coating may include other means for increasing the rate of exchange of electrons between the surface of the material and the remainder of the material relative to a material having no such coating.

Another method contemplated by the present invention is the assembling of an electrochemical cell using a self-supporting electrode. This method includes the steps of producing a disordered material previously described herein preferably by rapid solidification. The method further includes aligning the electrode in the predetermined position in a cell casing. Because of the structural integrity exhibited by the inventive electrodes even on extended cycling, the electrodes may be aligned immediately after formation in a cell casing. There is no need to add binder material or any special mechanical structure in order to support the electrode in the casing. Such a self-supporting electrode allows for ease of and inexpensive manufacture and assembly.

These methods not only avoid the use of a binder during the formation of electrodes, but also do not require that the electrodes be sintered. Sintering is often undesirable because of a decrease in the charge/discharge rates corresponding to the inherent decrease in the surface area caused by sintering.

The method may further include abrading or etching the material to remove surface contamination for operative contact with an electrolyte as previously discussed. Cleaning of the material to expose the material directly for operative contact with the electrolyte also is contemplated.

Additionally, the method may include placing a collector in electrical contact with the material so that electrons produced during the operation of the electrode may be collected. Again, coating the electrode is contemplated to alleviate the problems previously discussed.

EXAMPLE 1

The apparatus employed is similar to that depicted in FIG. 2. The chill wheel used has a diameter of 10 inches, is one inch wide and is made of copper. It is rotated at a speed of about 2500 rpm. A nozzle with an orifice having a diameter of 0.0889 cm. is mounted perpendicular to the direction of movement of the peripheral surface of the chill wheel. The axis through the crucible is at an 88° angle measured from the horizontal in the plane of the chill wheel axis. The gap between the orifice and the surface of the chill wheel is 0.159 cm. A material having the composition $Ti_{58.8}Cr_{4.4}Ni_{25.1}Al_{11.7}$ is employed. A manifold having a plurality of openings expels argon gas in such a manner that the gas pressure enhances the contact between the ribbon and the chill surface. The manifold is located parallel to the chill wheel surface and extends from top dead center to a point 45° after top dead center. A flow of argon at a pressure of 20 psi. is normally used. The details of the rapid quench techniques used in the present invention are discussed in the articles "Production of Amorphous Alloy Ribbons and Effects of Apparatus Parameters on Ribbon Dimensions" by Liebermann, et al., *IEEE Transactions on Magnetics*, Vol. MAG-12, No. 6, Nov. 1976, and "The Dependence of the Geometry of Glassy Alloy Ribbons on the Chill Block Melt-Spinning Process Parameters" by Liebermann, 43 *Materials Science and Engineering* 203-210, 1980, which are hereby incorporated by reference.

Several electrodes weighing in the range of 0.15 g to 0.35 g were cut from the ribbon. A nickel tab was used as an electron collector crimp connected to the ribbon electrode. The counter electrode was a nickel blank electrode. Each electrode was cycled in 4M KOH electrolyte at a charge rate of 250 mA/g for 2 hours and a discharge rate of 50 mA/g to −0.7 v Hg/HgO reference electrode. Of the first seven cycles, the highest capacity delivered by any one of the electrodes was 172 mAh/g.

EXAMPLES 2-6

The procedure of Example 1 was repeated to form material based upon the ternary composition of titanium, nickel, and aluminum. The same equipment was employed and any change in the process conditions is noted in Table I below. Although several electrodes of each composition were tested for electrochemical performance following the procedure of Example 1, only the highest capacity of any electrode measured during the first seven cycles is reported in Table I. Because a number of parameters in the rapid solidification process can be varied, electrodes having the same composition can differ in structure. Thus, some electrodes formed with differing process parameters shattered, broke, or cracked during the tests. In these instances, the cell capacity was not measured and is not reported herein.

TABLE I

| Example | 2 | 3 | 4 | 5 | 6 |
|---|---|---|---|---|---|
| Ti (atm. %) | 60 | 59 | 58 | 57 | 55 |
| Ni (atm. %) | 35 | 38 | 37 | 40 | 40 |
| Al (atm. %) | 5 | 3 | 5 | 3 | 5 |
| Chill Wheel (rpm) | 3000 | 2500 | 3000 | 2500 | 2500 |
| Orifice Dia. (cm) | .089 | .076 | .089 | .097 | .10 |
| Ribbon Thickness (microns) | 38-50 | 38 | 25 | 25-50 | 45-50 |
| Ribbon Width (cm) | .151 | .312 | .179 | .216 | .209 |
| Capacity (mAh/g) | 203 | 178 | 234 | 193 | 189 |

EXAMPLES 7-11

The procedure of Example 1 was repeated to form ribbon electrodes based upon the quaternary composition of titanium, nickel, aluminum, and either vanadium or zirconium. The same equipment was employed and any change in the process conditions is noted in Table II below. Although several electrodes of each composition were tested for electrochemical performance following the procedure of Example 1, only the highest capacity of any electrode measured during the first seven cycles is reported in Table II.

TABLE II

| Example | 7 | 8 | 9 | 10 | 11 | 12 |
|---|---|---|---|---|---|---|
| Ti (atm. %) | 55 | 55 | 50 | 50 | 45 | 45 |
| Ni (atm. %) | 35 | 30 | 35 | 35 | 35 | 35 |
| Al (atm. %) | 5 | 10 | 5 | 10 | 10 | 10 |
| V (atm. %) | 5 | 5 | 10 | 5 | 10 | |
| Zr (atm. %) | | | | | | 10 |
| Chill Wheel (rpm) | 2500 | 2500 | 3000 | 2500 | 2500 | 2500 |
| Orifice Dia. (cm) | .089 | .089 | .10 | .10 | .089 | .089 |
| Ribbon Thickness (microns) | 40 | 45 | 38 | 45 | 38 | 38-50 |
| Ribbon Width (cm) | .227 | .221 | .237 | .169 | .283 | .151 |
| Capacity (mAh/g) | 191 | 169 | 235 | 172 | 222 | 142 |

Figure 4:
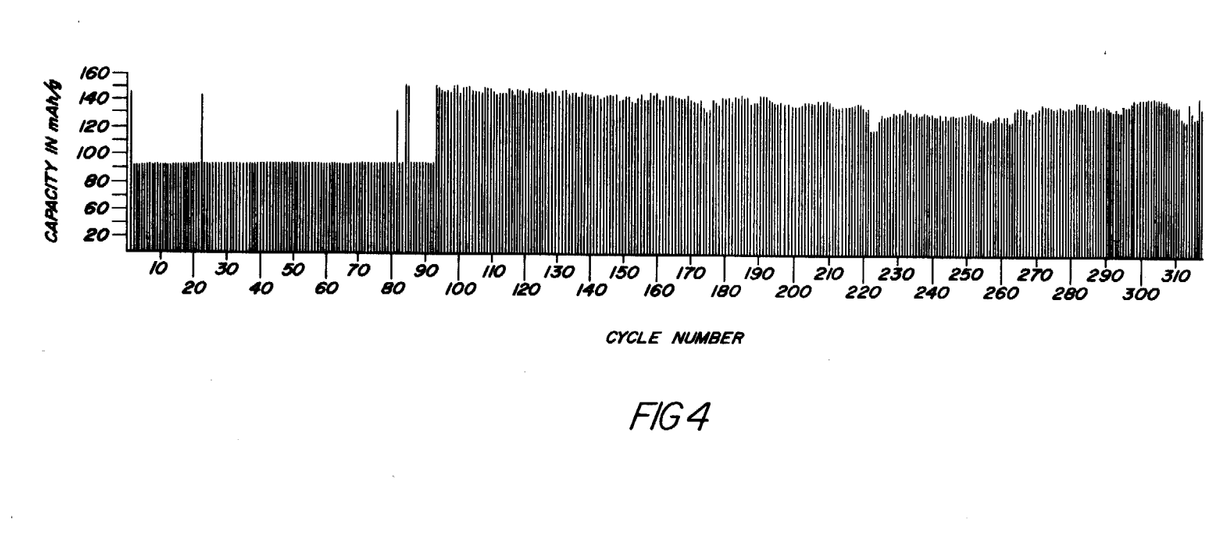
FIG. 4 is a graph of cell capacity versus cycle life for a cell having a ribbon electrode of the invention with a titanium-nickel-aluminum-vanadium composition.

The charge-discharge cycling test was extended for Example 9 to measure the cycle life of the electrode. FIG. 4 illustrates that the capacity did not significantly decrease even after 315 cycles were completed. In fact, the capacity decreased only about 13% comparing cycles 93-103 to cycles 305-315. For each cycle the charge rate was 250 mA/g for two hours and the discharge rate was 50mA/g to −0.7 volts. For the first 93 cycles, the electrode was charged to 56% of full capacity, and thereafter, to full capacity. The test was terminated on cycle 316.

The density of Example 9 was calculated by measuring the weight of the ribbon in air and subsequently in a fluid of known density. Specifically, isopropyl alcohol was used as the fluid. The density of the ribbon was calculated to be approximately 5.9 g/cc.

EXAMPLES 13-19

The procedure of Example 1 was repeated to form ribbon electrodes based upon the ternary composition of titanium, nickel, and niobium. Other elements such as aluminum, zirconium, vanadium, and hafnium also are added to the above ternary compositions in different combinations. The same equipment was employed and any change in the process conditions is noted in Table III below. Although several electrodes of each composition were tested for electrochemical performance following the procedure in Example 1, only the highest capacity of any electrode measured during the first seven cycles is reported in Table III.

The density of Example 17 was calculated by measuring the weight of the ribbon in air and subsequently in a fluid of known density. Specifically, isopropyl alcohol was used as the fluid. The density of the ribbon was calculated to be approximately 6.7 g/cc.

A solution of HF:H$_2$O in a ratio of 1:20 was prepared and used to etch Example 17 for fifteen minutes. The half cell capacities for three electrodes of Example 17 before and after etching are presented in Table IV at two discharge rates 51 and 257 mA/g. The increase in half cell capacities for electrodes which are etched is clearly illustrated.

TABLE IV

| Discharge Rate (mA/g) | Capacity mAh/g | | | |
|---|---|---|---|---|
| | #1 | #2 | #3 | Avg. ± s |
| NON-ETCHED ELECTRODES | | | | |
| 51 | 181 | 175 | 162 | 173 ± 10 |
| 257 | 77 | 98 | 59 | 78 ± 20 |

TABLE IV-continued

| Discharge Rate | Capacity mAh/g | | | |
|---|---|---|---|---|
| (mA/g) | #1 | #2 | #3 | Avg. ± s |
| ETCHED ELECTRODES | | | | |
| 51 | 190 | 207 | 179 | 192 ± 14 |
| 257 | 115 | 122 | 106 | 114 ± 8 |

Figure 5:
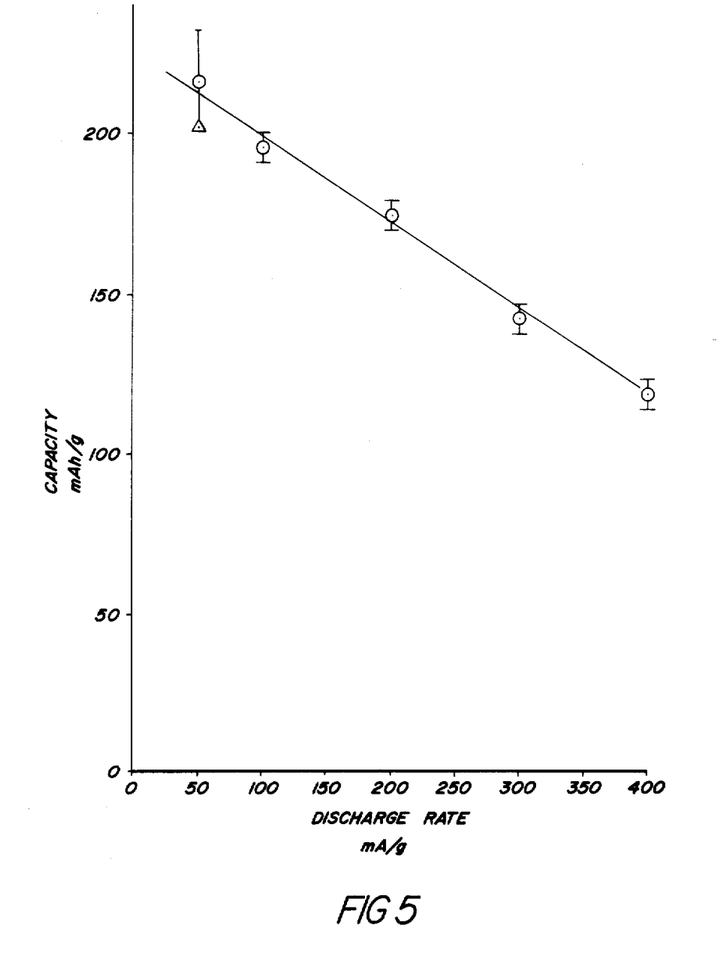
FIG. 5 is a graph of cell capacity versus discharge rate for a number of cells having a ribbon electrode of the invention.

The half cell capacity of Example 15 was measured at varying discharge rates and illustrated in FIG. 5. The first discharge rate was measured for ten cycles; each subsequent discharge rate was measured for seven cycles. The data points are the average of the three electrodes and last five cycles.

EXAMPLES 20 AND 21

The procedure of Example 1 was repeated to form electrodes based upon the binary composition of titanium and nickel with other elements such as tin, zirconium, vanadium, and aluminum added in various combinations. The same equipment was employed and any change in the process condition is noted in Table I below. Although several electrodes of each composition were tested for electrochemical performance following the procdure in Example 1, only the highest capacity of any electrode measured during the first seven cycles is reported in Table V.

TABLE V

| Example | 20 | 21 |
|---|---|---|
| Ti (atm. %) | 59 | 58 |
| Ni (atm. %) | 38 | 35 |
| Sn (atm. %) | 3 | 2 |
| Al (atm. %) | | 5 |
| Chill Wheel (rpm) | 2500 | 2500 |
| Orifice Dia. (cm) | .089 | .089 |
| Ribbon Thickness (microns) | 25 | 20–25 |
| Ribbon Width (cm) | .234 | .139–.217 |
| Capacity (mAh/g) | 164 | 150 |

TABLE III

| Example | 13 | 14 | 15 | 16 | 17 | 18 | 19 |
|---|---|---|---|---|---|---|---|
| Ti (atm. %) | 44 | 55 | 45 | 45 | 30 | 45 | 45 |
| Ni (atm. %) | 40 | 30 | 40 | 40 | 45 | 40 | 40 |
| Nb (atm. %) | 11 | 10 | 5 | 10 | 20 | 5 | 10 |
| Al (atm. %) | 5 | 5 | 5 | | | | |
| Zr (atm. %) | | | | 5 | 5 | 5 | |
| V (atm. %) | | | 5 | | 5 | | |
| Hf (atm. %) | | | | | | | 5 |
| Chill Wheel (rpm) | 2500 | 2500 | 2500 | 2500 | 2500 | 2500 | 2500 |
| Orifice Dia. (cm.) | .089 | .089 | .20 | .10 | .089 | .12 | .15 |
| Ribbon Thickness (microns) | 25–32 | 25–50 | 40–50 | 30 | 33 | 38–50 | 25–30 |
| Ribbon Width (cm) | .194 | .115–.188 | .138 | .271 | .170 | .76 | .169–.208 |
| Capacity (mAh/g) | 260 | 250 | 202 | 235 | 249 | 227 | 216 |

As illustrated by these examples, a number of advantages result from use of the inventive electrodes. Since the electrodes are self-supporting, there is no need to use binder material to impart structural integrity to the electrode. This results in an immediate gain in energy density for the electrode since less inactive material is being used. The cell capacity can be increased without a concomital increase in porosity which would otherwise lead to corrosion and degradation of the structural integrity of the electrode material. The electrochemical performance of the electrodes indicates enhanced cycle life without a significant decrease in cell capacity.

Having a material which maintains its structural integrity during cycling, the material allows flexibility in maximizing the cell capacity. The structure of the electrode also allows for repeated volumetric expansion and contraction without structural degradation during the absorption and desorption of hydrogen. The electrode allows the optimization of charge and discharge rates since the surface area to volume ratio can be controlled by changing the thickness and width of the electrode itself.

Generally, the electrodes are flexible allowing easy alignment in a battery casing. Without the need for binder material or special structural devices for their alignment, using the inventive electrodes to assemble a battery is inexpensive and simple.

Modifications and variations of the present invention are possible in light of the above teachings. It is, therefore, to be understood that within the scope of the appended claims the invention may be practiced otherwise than as specifically described.

What is claimed is:

1. A hydrogen storage electrode for an alkaline hydrogen storage electrochemical cell comprising at least one solid, metallic, amorphous electrochemically active body, capable of being self-supporting and formed by rapid solidification from a melt thereby having a nonparticulate, dimensionally anisotropic shape characterized by a continuous amorphous structure throughout, said body having a composition comprising at least three elements, said three elements comprising titanium, nickel and at least one element selected from the group consisting of aluminum, boron, chromium, cobalt, hafnium, indium, lead, magnesium, molybdenum, niobium, palladium, tin, zirconium and rare earth metals, each of said elements preset in an effective amount so that said electrode is capable of being electrochemically charged with hydrogen to store energy and capable of electrochemically discharging hydrogen and releasing energy, while maintaining its structural integrity during electrochemical charge and discharge cycles.

2. The hydrogen storage electrode of claim 1 wherein the composition of said active body comprises titanium, nickel, and aluminum.

3. The hydrogen storage electrode of claim 2 wherein the composition of said active body further comprises at least one element selected from the group consisting of niobium, chromium, vanadium, cobalt, copper, iron, zirconium and hafnium.

4. The hydrogen storage electrode of claim 1 wherein the composition of said active body comprises, on an atomic basis, from about 40% to about 60% titanium, from about 15% to about 55% nickel and from about a trace to about 15% aluminum.

5. The hydrogen storage electrode of claim 1 wherein the total porosity of said active body is less than about 5% by volume.

6. The hydrogen storage electrode of claim 1 wherein the composition of said body comprises, on an atomic basis, of from about 40% to about 75% titanium, from about 15% to about 55% nickel and from a trace amount to about 15% aluminum.

7. The hydrogen storage electrode of claim 6 wherein the composition of said body further comprises at least one additional element selected from the group consisting of niobium, chromium, cobalt, copper, iron, zirconium, vanadium and hafnium, present in an amount of up to about 11% on an atomic basis.

8. The hydrogen storage electrode of claim 7 wherein said additional element is present in an amount of from about 3% to about 5% on an atomic basis.

9. The hydrogen storage electrode of claim 1 wherein the composition of said body comprises, on an atomic basis, of from about 44% to about 60% titanium, from about 35% to about 40% nickel and from about 3% to about 5% aluminum.

10. The hydrogen storage electrode of claim 9 wherein the composition of said body further comprises from about 5% to about 11% niobium on an atomic basis.

11. The hydrogen storage electrode of claim 10 wherein the composition of said body further comprises about 5% vanadium on an atomic basis.

12. The hydrogen storage electrode of claim 1 wherein the composition of said body comprises titanium, nickel, niobium and zirconium.

13. The hydrogen storage electrode of claim 12 wherein the composition of said body further comprises vanadium.

14. The hydrogen storage electrode of claim 12 wherein the composition of said body comprises, on an atomic basis, from about 5% to about 55% titanium, from about 30% to about 60% nickel, from about 10% to about 20% niobium and from about 3% to about 10% zirconium.

15. The hydrogen storage electrode of claim 14 wherein the composition of said body further comprises about 5% vanadium by weight.

16. The hydrogen storage electrode of claim 11 wherein said body is rechargeable.

17. The hydrogen storage electrode of claim 1 wherein said active body consists essentially of titanium, nickel, niobium and zirconium.

18. The hydrogen storage electrode of claim 1 wherein said active body consists essentially of titanium, nickel, niobium, zirconium and vanadium.

19. The hydrogen storage electrode of claim 1 wherein said at least one additional element is selected from the group consisting of hafnium, indium, lead, molybdenum and tin.

20. A hydrogen storage electrode for an alkaline hydrogen storage electrochemical cell comprising at least one solid, amorphous active body, capable of being self-supporting and formed by rapid solidification from a melt thereby having a non-particulate, dimensionally anisotropic shape characterized by a continuous amorphous structure throughout, said body consisting essentially of at least three elements, said elements being titanium, nickel and at least one element selected from the group consisting of zirconium, aluminum, tin, indium, lead, rare earth metals, cobalt, chromium, copper, iron, vanadium, niobium, magnesium, molybdenum, palladium, boron, and hafnium, each of said elements present in an effective amount so that said hydrogen storage electrode is capable of being electrochemically charged with hydrogen to store energy and capable of electrochemically discharging and releasing energy, while maintaining its structural integrity during electrochemical charge and discharge cycles.

21. The hydrogen storage electrode of claim 20 wherein the total porosity of said active body is less than about 5% by volume.

22. The hydrogen storage electrode of claim 20 wherein the composition of said body consists essentially of, on an atomic basis, of from about 40% to about 75% titanium, from about 15% to about 55% nickel and from a trace amount to about 15% aluminum.

23. The hydrogen storage electrode of claim 20 wherein the composition of said body consists essentially of, on atomic basis, of from about 5% to about 55% titanium, from about 30% to about 60% nickel, from about 10% to about 20% niobium and from about 3% to about 10% zirconium.

24. The hydrogen storage electrode of claim 20 wherein said body is rechargeable.

25. A hydrogen storage electrochemical cell comprising:
(a) at least one hydrogen storage electrode for a hydrogen storage electrochemical cell comprising at least one self-supporting solid, metallic, amorphous electrochemically active body formed by rapid solidification from a melt thereby having a non-particulate, dimensionally anisotropic shape characterized by a conitnuous amorphous structure throughout, said body having a composition comprising at least three elements, said elements being titanium, nickel and at least one element selected from the group consisting of aluminum, boron, chromium, cobalt, hafnium, indium, lead, magnesium, molybdenum, niobium, palladium, tin, zirconium and rare earth metals, each of said elements present in an effective amount so that said electrode is capable of being electrochemically charged with hydrogen to store energy and capable of electrochemically discharging hydrogen and releasing energy, while maintaining its structural integrity during electrochemical charge and discharge cycles;
(b) at least one counter electrode means for allowing the release of the energy stored in said hydrogen storage electrode, said counter electrode means positioned in said cell and spaced in operative relation with said electrode means; and
(c) casing means having said hydrogen storage electrode and said counter electrode means positoned therein.

26. The hydrogen storage electrochemical cell of claim 25 wherein the composition of said active body comprises titanium, nickel and aluminum.

27. The hydrogen storage electrochemical cell of claim 26 wherein the composition of said active body further comprises at least one element selected from the group consisting of niobium, chromium, cobalt, copper, iron, zirconium and hafnium.

28. The hydrogen storage electrochemical cell of claim 25 wherein the composition of said body comprises, on an atomic basis, of from about 5% to about 55% titanium, from about 30% to about 60% nickel, from about 10% to about 20% niobium and from about 3% to about 10% zirconium.

29. The hydrogen storage electrochemical cell of claim 25 wherein said hydrogen storage electrode and said counter electrode means are spirally wound about an axis in a jelly-roll configuration.

30. The hydrogen storage electrochemical cell of claim 25 wherein said hydrogen storage electrode comprises said active body present as a substantially flat sheet and said counter electrode means comprises at least one substantially flat sheet.

31. The hydrogen storage electrochemical cell of claim 25 wherein said active body has a composition comprising, on an atomic basis, of from about 40% to about 75% titanium, from about 15% to about 55% nickel and from a trace amount to about 15% aluminum.

32. The hydrogen storage electrochemical cell of claim 25 wherein said active body has a composition comprising, on an atomic basis, of from about 44% to about 60% titanium, from about 35% to about 40% nickel and from about 3% to about 5% aluminum.

33. The hydrogen storage electrochemical cell of claim 32 wherein the composition of said active body further comprises from about 5% to about 11% niobium on an atomic basis.

* * * * *

REEXAMINATION CERTIFICATE (2578th)
United States Patent [19]
Keem et al.

[11] B1 4,637,967

[45] Certificate Issued May 16, 1995

[54] ELECTRODES MADE WITH DISORDERED ACTIVE MATERIAL AND METHODS OF MAKING THE SAME

[75] Inventors: John E. Keem, Bloomfield Hills; Richard C. Bergeron, Romulus; Russell C. Custer, Clawson; William McCallum, Birmingham, all of Mich.

[73] Assignee: Ovonic Battery Company, Troy, Mich.

Reexamination Request:
No. 90/003,410, Apr. 15, 1994

Reexamination Certificate for:
Patent No.: 4,637,967
Issued: Jan. 20, 1987
Appl. No.: 770,704
Filed: Aug. 29, 1985

Related U.S. Application Data

[63] Continuation of Ser. No. 546,651, Oct. 28, 1983, abandoned.

[51] Int. Cl.⁶ .................... H01M 4/86; H01M 4/90
[52] U.S. Cl. ..................... 429/101; 429/59; 429/218; 420/900
[58] Field of Search ............ 420/900, 451; 429/57, 429/59, 101, 218

[56] References Cited

U.S. PATENT DOCUMENTS
3,669,745  6/1972  Beccu .................................. 136/20
4,431,561  2/1984  Ovshinsky et al. ................. 252/184

OTHER PUBLICATIONS
Spit, F. H. M. et al., "Hydrogen Sorption By The Metallic Glass $Ni_{64}$ and $Zr_{36}$ And By Related Crystalline Compounds", Scripta METALLURGICA, vol. 14, pp. 1071–1076, 1980.
Spit, F. H. M. et al., "Hydrogen Sorption in Amorphous Ni(Zr, Ti)–Alloys", pp. 809–816, 1979.
Spit, Ferninandus Henricus Maria, "The Thermodynamics and Kinetics of Hydrogen Solution In Some Metallic Glasses", pp. 1–137, 1958.

*Primary Examiner*—Stephen Kalafut

[57] ABSTRACT

The present invention provides an electrode which uses a disordered active material preferably formed by rapid solidification. The active material does not need a binder to be used as an electrode, and thus, is considered self-supporting. The material also is substantially non-porous or impermeable to an electrolyte and when used as an electrode exhibits an increase in cell capacity with improved resistance to corrosion. An electrode of the present invention provides greatly improved cycle life and energy density without a significant decrease in cell capacity. Methods of making the electrode by rapidly solidifying a disordered material are also included. A method of assembling an electrochemical cell using a self-supporting electrode includes the step of producing a disordered active material and aligning the material in a predetermined position in a cell casing.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 25-33 is confirmed.

Claims 1 and 20 are determined to be patentable as amended.

Claims 2-19 and 21-24, dependent on an amended claim, are determined to be patentable.

1. [A] *An electrochemically operative* hydrogen storage electrode for an alkaline hydrogen storage electrochemical cell, *said electrode having a surface layer surrounding the bulk material of said electrode and comprising electrolyte and* at least one solid, metallic, amorphous electrochemically active body, capable of being self-supporting and formed by rapid solidification from a melt thereby having a non-particulate, dimensionally anisotropic shape characterized by a continuous amorphous structure throughout, said body having a composition comprising at least three elements, said three elements comprising titanium, nickel and at least one element selected from the group consisting of aluminum, boron, chromium, cobalt, hafnium, indium, lead, magnesium, molybdenum, niobium, palladium, tin, zirconium and rare earth metals, each of said elements [preset] *present* in an effective amount so that said electrode is capable of being electrochemically charged with hydrogen to store energy and capable of electrochemically discharging hydrogen and releasing energy, while maintaining its structural integrity during electrochemical charge and discharge cycles, *whereby said electrolyte is contained in said electrode.*

20. [A] *An electrochemically operative* hydrogen storage electrode for an alkaline hydrogen storage electrochemical cell, *said electrode having a surface layer surrounding the bulk material of said electrode and comprising electrolyte and* at least one solid, *metallic,* amorphous *electrochemically* active body, capable of being self-supporting and formed by rapid soldification from a melt thereby having a non-particulate, dimensionally anisotropic shape characterized by a continuous amorphous structure throughout, said body consisting essentially of at least three elements, said elements being titanium, nickel and at least one element selected from the group consisting of zirconium, aluminum, tin, indium, lead, rare earth metals, cobalt, chromium, copper, iron, vanadium, niobium, magnesium, molybdenum, palladium, boron, and hafnium, each of said elements present in an effective amount so that said hydrogen storage electrode is capable of being electrochemically charged with hydrogen to store energy and capable of electrochemically discharging *hydrogen* and releasing energy, while maintaining its structural integrity during electrochemical charge and discharge cycles, *whereby said electrolyte is contained in said electrode.*

* * * * *